(12) United States Patent
D'Souza et al.

(10) Patent No.: US 9,404,386 B2
(45) Date of Patent: Aug. 2, 2016

(54) SYSTEM AND METHOD FOR MONITORING HEALTH OF AIRFOILS

(71) Applicant: General Electric Company, Schenectady, NY (US)

(72) Inventors: Prashanth D'Souza, Bangalore (IN); Venkatesh Rajagopalan, Bangalore (IN)

(73) Assignee: General Electric Company, Schenectady, NY (US)

( * ) Notice: Subject to any disclaimer, the term of this patent is extended or adjusted under 35 U.S.C. 154(b) by 386 days.

(21) Appl. No.: 14/089,995

(22) Filed: Nov. 26, 2013

(65) Prior Publication Data

US 2015/0226081 A1 Aug. 13, 2015

(30) Foreign Application Priority Data

Nov. 30, 2012 (IN) ............................ 5014/CHE/2012

(51) Int. Cl.
 *F01D 21/00* (2006.01)
 *G01M 5/00* (2006.01)
 *F01D 5/00* (2006.01)

(52) U.S. Cl.
 CPC ............ *F01D 21/003* (2013.01); *G01M 5/0016* (2013.01); *G01M 5/0033* (2013.01); *F01D 5/005* (2013.01)

(58) Field of Classification Search
 CPC . G01M 5/0016; G01M 5/0033; F01D 21/003; F01D 5/005
 USPC .......................................................... 73/660
 See application file for complete search history.

(56) References Cited

U.S. PATENT DOCUMENTS

| | | | |
|---|---|---|---|
| 5,974,882 A | 11/1999 | Heath | |
| 6,594,619 B1 | 7/2003 | Von Flotow | |
| 7,043,348 B2 | 5/2006 | Uluyol et al. | |
| 7,243,048 B2 | 7/2007 | Foslien et al. | |
| 7,421,351 B2 | 9/2008 | Navratil | |
| 7,526,405 B2 | 4/2009 | Miller | |
| 7,693,643 B2 | 4/2010 | Kim et al. | |
| 8,146,433 B2 * | 4/2012 | Kishino | G01M 13/028 73/593 |
| 9,045,999 B2 * | 6/2015 | Badami | F01D 21/003 |
| 9,046,000 B2 * | 6/2015 | Kominsky | F01D 21/003 |
| 9,103,741 B2 * | 8/2015 | Baik | G01M 5/0016 |

(Continued)

FOREIGN PATENT DOCUMENTS

EP 2402563 A2 1/2012

OTHER PUBLICATIONS

Abouhnik, Abdelnasser, et al., "Wind Turbine Blades Fault Detection Based on Principal Component Analysis", Proceedings of the International Conference on Applications and Design in Mechanical Engineering (ICADME), Feb. 27-28, 2012, Penang, Malaysia.

(Continued)

*Primary Examiner* — J M Saint Surin
(74) *Attorney, Agent, or Firm* — Douglas D. Zhang; GE Global Patent Operations (57) ABSTRACT

A method comprising the steps of determining normalized delta times of arrival corresponding to a plurality of blades based upon actual times of arrival corresponding to the plurality of blades, and determining static deflections of the plurality of blades by removing effects of one or more common factors from the normalized delta times of arrival corresponding to the plurality of blades.

18 Claims, 9 Drawing Sheets

(56) References Cited

U.S. PATENT DOCUMENTS

| | | | |
|---|---|---|---|
| 2010/0161245 A1* | 6/2010 | Rai | F01D 21/003 702/35 |
| 2011/0010108 A1* | 1/2011 | Bhattacharya | F01D 21/003 702/34 |
| 2011/0293403 A1 | 12/2011 | Badami | |
| 2011/0313726 A1 | 12/2011 | Parthasarathy et al. | |
| 2011/0320137 A1* | 12/2011 | Rajagopalan | F01D 21/003 702/34 |
| 2011/0320138 A1* | 12/2011 | Rajagopalan | F01D 21/003 702/34 |
| 2013/0006541 A1 | 1/2013 | Kominsky | |
| 2013/0082833 A1 | 4/2013 | Bhattacharya et al. | |

OTHER PUBLICATIONS

Wang, Qiuyan, et al., "PCA-AR Based Fault Prognosis for Turbine Machine", International Conference on Mechatronics and Automation (ICMA), Aug. 7-10, 2011, pp. 1605-1610, Beijing, China.

Abouhnik, A., et al., "Novel Approach to Rotating Machinery Diagnostics Based on Principal Component and Residual Matrix Analysis (PCRMA)", International Scholarly Research Network ISRN Mechanical Engineering, 2012, vol. 2012.

Gupta, S., et al., "Fault Detection and Isolation in Aircraft Gas Turbine Engines. Part 1: Underlying Concept", Department of Mechanical Engineering—The Pennsylvania State University, Nov. 10, 2007, pp. 307-318, vol. 222 Part G: J. Aerospace Engineering, University Park, Pensylvania, USA.

He, Tao, et al., "Process Fault Detection and Diagnosis Based on Principal Component Analysis", International Conference on Machine Learning and Cybernetics, Aug. 13-16, 2006, pp. 3551-3556.

Amilcar, Rincon, "Multiple Fault Detection and Diagnosis in a Gas Turbine using Principal Component Analysis and Structured Residuals", 20th Mediterranean Conference on Control & Automation (MED), Jul. 3-6, 2012, pp. 91-97, Barcelona, Spain.

EP Search Report and Written Opinion issued May 30, 2014 in connection with corresponding EP Patent Application No. 13194494.4.

* cited by examiner

SYSTEM AND METHOD FOR MONITORING HEALTH OF AIRFOILS

BACKGROUND OF THE INVENTION

Embodiments of the disclosure relates generally to systems and methods for monitoring health of rotor blades or airfoils.

Rotor blades or airfoils play a crucial role in many devices with several examples including axial compressors, turbines, engines, turbo-machines, or the like. For example, an axial compressor has a series of stages with each stage comprising a row of rotor blades or airfoils followed by a row of static blades or static airfoils. Accordingly, each stage comprises a pair of rotor blades or airfoils and static airfoils. Typically, the rotor blades or airfoils increase the kinetic energy of a fluid that enters the axial compressor through an inlet. Furthermore, the static blades or static airfoils generally convert the increased kinetic energy of the fluid into static pressure through diffusion. Accordingly, the rotor blades or airfoils and static airfoils increase the pressure of the fluid.

Furthermore, the axial compressors that include the rotor blades or airfoils and the static airfoils have wide and varied applications. Axial compressors, for example, may be used in a number of devices, such as, land based gas turbines, jet engines, high speed ship engines, small scale power stations, or the like. In addition, the axial compressors may have other applications, such as, large volume air separation plants, blast furnace air, fluid catalytic cracking air, propane dehydrogenation, or the like.

The airfoils operate for long hours under extreme and varied operating conditions such as, high speed, pressure and temperature that affect the health of the airfoils. In addition to the extreme and varied operating conditions, certain other factors lead to fatigue and stress of the airfoils. The factors, for example, may include inertial forces including centrifugal force, pressure, resonant frequencies of the airfoils, vibrations in the airfoils, vibratory stresses, temperature stresses, reseating of the airfoils, load of the gas or other fluid, or the like. A prolonged increase in stress and fatigue over a period of time leads to defects and cracks in the airfoils. One or more of the cracks may widen with time to result in liberation of an airfoil or a portion of the airfoil. The liberation of airfoil may be hazardous for the device that includes the airfoils, and thus may lead to enormous monetary losses. In addition, it may be unsafe for people located near the device.

Accordingly, it is highly desirable to develop a system and method that may predict health of airfoils in real time. More particularly, it is desirable to develop a system and method that may detect and predict cracks or fractures in real time.

BRIEF DESCRIPTION OF THE INVENTION

Briefly in accordance with one aspect of the technique, a method is presented. The method includes the steps of determining normalized delta times of arrival corresponding to a plurality of blades based upon actual times of arrival corresponding to the plurality of blades, and determining static deflections of the plurality of blades by removing effects of one or more common factors from the normalized delta times of arrival corresponding to the plurality of blades.

In accordance with an aspect, a system including a processing subsystem is presented. The processing subsystem determines normalized delta times of arrival corresponding to a plurality of blades based upon actual times of arrival corresponding to the plurality of blades, and generates static deflections of the plurality of blades by removing effects of one or more common factors from the normalized delta times of arrival corresponding to the plurality of blades.

In accordance with another aspect of the present systems a processing subsystem is presented. The processing subsystem determines a plurality of modes corresponding to a plurality of blades based upon normalized delta times of arrival corresponding to the plurality blades, determines a plurality of blade coefficients corresponding to the plurality of modes and the plurality of blades based upon the normalized delta times of arrival, identifies one or more blade coefficients in the plurality of blade coefficients that correspond to common modes in the plurality of modes, equating the one or more blade coefficients in the plurality of blade coefficients to zero to generate a reconstruction matrix, and determines static deflections corresponding to the blades based upon the normalized delta times of arrival and the plurality of modes.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

As discussed in detail below, embodiments of the present systems and techniques evaluate the health of one or more blades or airfoils. More particularly, the present systems and techniques determine static deflection of the blades or airfoils. The static deflection of the blades, for example, may be used to monitor the health of the blades. Hereinafter, the terms "airfoils" and "blades" will be used interchangeably. The static deflection, for example, may be used to refer to a steady change in an original or expected position of a blade from the expected or original position of the blade.

In operation during rotations of blades, times of arrival (TOAs) (hereinafter referred to as actual TOAs) of the blades at a reference position may vary from expected TOAs due to one or more cracks or defects in the blades. Accordingly, the variation in the TOAs of the blades may be used to determine the static deflection of the blades. As used herein, the term "expected TOA" may be used to refer to a TOA of a blade at a reference position when there are no defects or cracks in the blade and the blade is working in an ideal situation, load conditions are optimal, and the vibrations in the blade are minimal.

In addition to the cracks or defects in the blades, the actual TOAs may also vary due to effects of one or more common factors. As used herein, the term "common factors" is used to refer to reasons that are common to blades in a device, wherein the reasons impact (for example: advances or delays) actual TOAs corresponding to the blades. The common factors, for example, may include operational parameters, reseating of blades, and the like. The operational parameters, for example, may include an inlet guide vane (IGV) angle, a load variation, reseating of a blade, variation of speed, temperature, speed, or the like.

As used herein, the term "reseating of a blade" may be used to refer to a locking of a blade at a position different from the original or expected position of the blade in joints, such as, a dovetail joint. Typically, the blades are fastened to a rotor via one or more joints, such as, dovetail joints. During start-up of a device that includes the blades, the blades may shift from their original positions in the joints and may lock in the joints at positions that are different from the original positions of the blades. By way of an example, the device may include a gas turbine, a compressor, or the like. The locking of the blades in the joints at the positions different from the original positions of the blades is referred to as reseating of the blades. The change in the positions of the blades may vary actual TOAs of the blades.

Consequently, due to the effects of the common factors and the cracks or defects in the blades on actual TOAs corresponding to the blades, the static deflections of the blades vary from an exact or accurate static deflection. Accordingly, to monitor the health of the blades or determine cracks or defects in the blades, it is desirable to negate the effects of the common factors on actual TOAs corresponding to the blades. Certain embodiments of the present systems and techniques remove the effects of the common factors to determine static deflection of blades.

Figure 1:
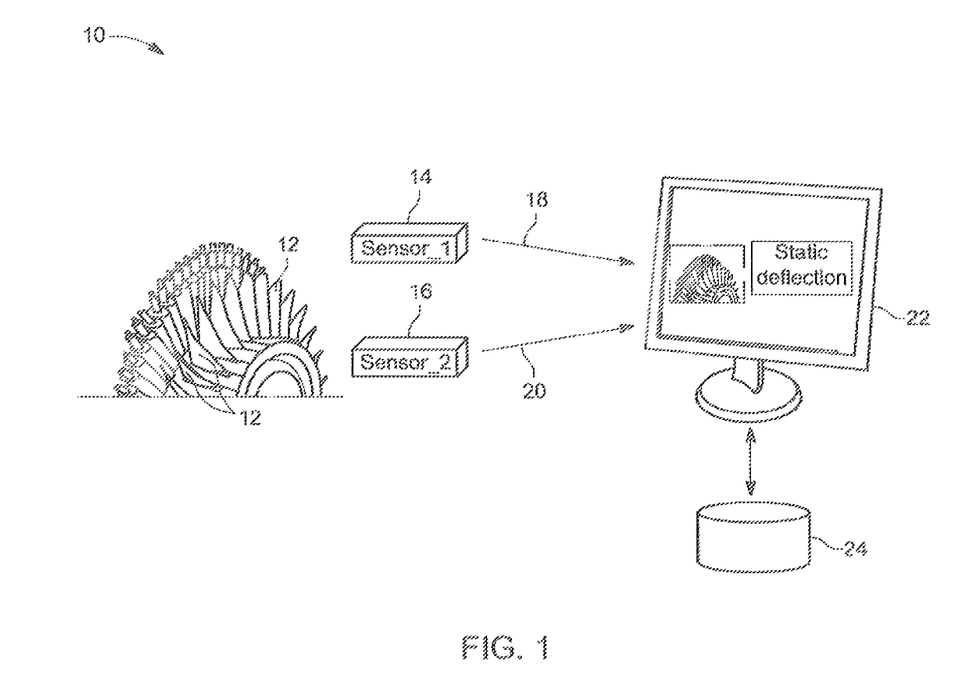
FIG. 1 is an exemplary diagrammatic illustration of a blade health monitoring system, in accordance with an embodiment of the present system.

FIG. 1 is a diagrammatic illustration of a blade health monitoring system 10, in accordance with an embodiment of the present system. As shown in FIG. 1, the system 10 includes one or more blades or airfoils 12 that are monitored by the system 10 to determine static deflection of the blades 12. Furthermore, the system 10 determines the health of the blades 12 based upon the static deflection of the blades 12. As shown in the presently contemplated configuration, the system 10 includes one or more sensors 14, 16. Each of the sensors 14, 16 generate blade passing signals (BPS) 18, 20, respectively that are representative of actual times of arrival (TOAs) of the blades 12 at a reference point. In one embodiment, the sensors 14, 16 sense an arrival of the one or more blades 12 at the reference point to generate the BPS 18, 20. The reference point, for example, may be underneath the sensors 14, 16 or adjacent to the sensors 14, 16. In an embodiment, each of the BPS 18, 20 are sampled and/or measured for a particular time period and is used for determining actual TOAs of a blade. The actual TOAs, for example, may be measured in units of time or degrees.

In one embodiment, the sensors 14, 16 may sense an arrival of the leading edge of the one or more blades 12 to generate the BPS 18, 20. In another embodiment, the sensors 14, 16 may sense an arrival of the trailing edge of the one or more blades 12 to generate the BPS 18, 20. In still another embodiment, the sensor 14 may sense an arrival of the leading edge of the one or more blades 12 to generate the BPS 18, and the sensor 16 may sense an arrival of the trailing edge of the one or more blades 12 to generate the BPS 20, or vice versa. The sensors 14, 16, for example, may be mounted adjacent to the one or more blades 12 on a stationary object in a position such that an arrival of the one or more blades 12 may be sensed efficiently. In one embodiment, at least one of the sensors 14, 16 is mounted on a casing (not shown) of the one or more blades 12. By way of a non-limiting example, the sensors 14, 16 may be magnetic sensors, capacitive sensors, eddy current sensors, or the like.

As illustrated in the presently contemplated configuration, the BPS 18, 20 are received by a processing subsystem 22. The processing subsystem 22 determines actual TOAs of the one or more blades 12 based upon the BPS 18, 20. Furthermore, the processing subsystem 22 determines static deflection of the one or more blades 12 based upon the actual TOAs of the one or more blades 12. More particularly, the processing subsystem 22 is configured to determine the static deflection of the one or more of the blades 12 by processing the actual TOAs of the one or more blades 12. The actual TOAs of the blades 12 may be affected due to one or more common factors. As used herein, the term "common factors" is used to refer to reasons that are common to all blades in a device, wherein the reasons impact (for example: advances or delays) the actual TOAs corresponding to the blades. The common factors, for example, may include operational parameters, reseating of blades, and the like.

If static deflections of the blades 12 are determined based upon such actual TOAs without removing the effects of the common factors, then such static deflections may wrongly suggest cracks in the one or more of the blades 12, even though there is no crack or defect in the blades 12. Therefore, in the presently contemplated techniques, the processing subsystem 22, for example, determines static deflections of the blades 12 by removing the effects of the common factors from the actual TOAs corresponding to the blades 12. In one embodiment, the processing subsystem 22, for example, may determine static deflection corresponding to the blades 12 by removing the effects of the common factors from normalized delta TOAs that are determined based upon the actual TOAs corresponding to the blades 12. The effects of the common factors, for example, may be removed by applying techniques comprising a principal components analysis technique, a singular value decomposition technique, an independent component analysis technique, or combinations thereof. As used herein, the term "normalized delta TOA" refers to a numerical value corresponding to an actual TOA of a blade in a plurality of blades, wherein the numerical value is determined based upon actual TOAs corresponding to the plurality of blades, and a blade spacing parameter. The determination of the normalized delta TOAs and the blade spacing parameter will be explained in detail with reference to FIG. 2 and FIG. 3.

In one embodiment, the processing subsystem 22 determines the static deflection corresponding to the blades 12 by applying a principal component analysis technique (PCA) to the actual TOAs or normalized delta TOAs. Accordingly, the processing subsystem 22 may remove the effects of common factors from the actual TOAs by applying a principal components analysis technique to the actual TOAs. In one embodiment, the processing subsystem removes the effects of the common factors from the actual TOAs using techniques including a principal components analysis technique, a singular value decomposition technique, an independent component analysis technique, or combinations thereof. The determination of the static deflection shall be explained in greater detail with reference to FIG. 2 to FIG. 6. In one embodiment, the processing subsystem 22 may have a data repository 24 that stores data, such as, static deflection, dynamic deflection, TOA, delta TOA, any intermediate data, or the like.

It is noted that in the presently contemplated configuration, the effects of the common factors, such as, operational parameters are removed from the actual TOAs without recourse to any data relating to the common factors, such as, the operational parameters, reseating of blades, and the like. Accordingly it is noted that in the presently contemplated techniques, data from external devices, such as, an onsite monitoring device or any other device is not required for removal of effects of common factors from the actual TOAs, or the normalized delta TOAs. The operational parameters, for example, may include an inlet guide vane (IGV) angle, a load variation, reseating of a blade, variation of speed, temperature, speed, or the like.

Figure 2:
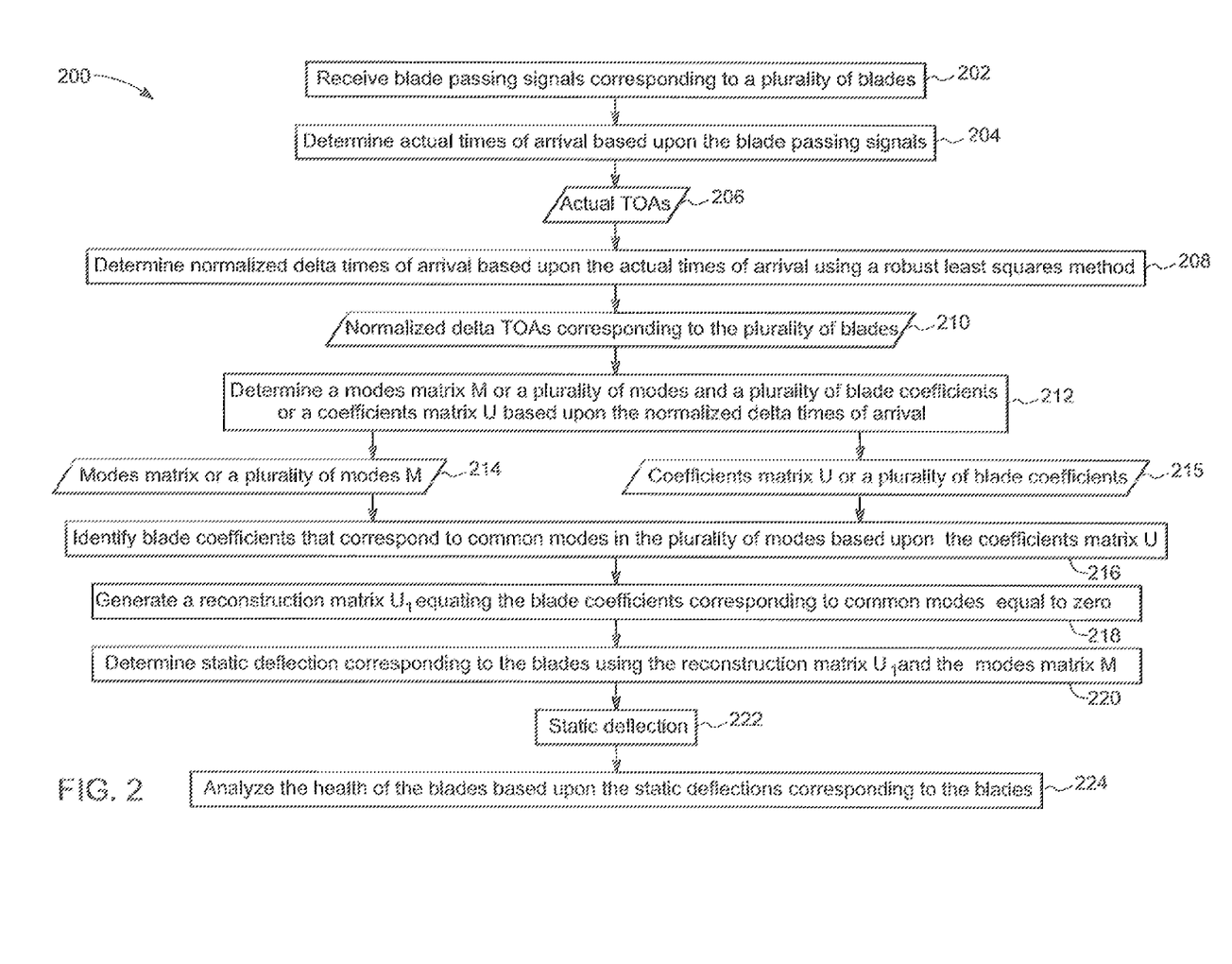
FIG. 2 is a flow chart representing an exemplary method for determining static deflection, in accordance with an embodiment of the present techniques.

Referring now to FIG. 2, a flowchart representing an exemplary method 200 for determining static deflection of a plurality of blades, in accordance with an embodiment of the present techniques, is depicted. The plurality of blades, for example, may be the blades 12 (see FIG. 1). Hereinafter, for ease of understanding, the determination of the static deflection shall be explained with reference to the blades 12. At step 202, blade passing signals (BPS) corresponding to the blades 12 may be received by a processing subsystem, such as, the processing subsystem 22 (see FIG. 1). As previously noted with reference to FIG. 1, the BPS may be generated by a sensor, such as, the sensors 14, 16 (see FIG. 1). The BPS, for example, may be the BPS 18, 20. (See FIG. 1).

Furthermore, at step 204 actual times of arrival (TOAs) 206 of the blades 12 are determined by the processing subsystem. The processing subsystem determines the actual TOAs by sampling the BPS. Particularly, the processing subsystem determines one or more actual TOAs corresponding to a blade utilizing a BPS corresponding to the blade. At step 208, normalized delta TOAs 210 corresponding to the blades 12 may be determined. As used herein, the term "normalized delta TOA" refers to a numerical value corresponding to an actual TOA of a blade in a plurality of blades, wherein the numerical value is determined based upon actual TOAs corresponding to the plurality of blades and a blade spacing parameter. The normalized delta TOAs 210, for example may be determined by the processing subsystem. In one embodiment, the normalized delta TOAs 210 is determined by applying a robust least squares technique or a weighted least squares technique on the actual TOAs 206. The determination of the normalized delta TOAs 210 using the robust least squares technique eliminates the explicit normalization steps. The determination of the normalized delta TOAs using the robust least squares technique reduces the extreme sensitivity to one or more outlier actual TOA's, when the one or more outlier actual TOA's exist; for example, actual TOA's of a cracked blade. In one embodiment, the determination of the normalized delta TOAs 210 using the robust least squares techniques generates the normalized delta TOAs that has been normalized for effects of load without recourse to load data. The determination of normalized delta TOAs is explained in greater detail with reference to FIG. 3 and FIG. 4. At step 212, a modes matrix M or a plurality of modes 214 may be determined. Furthermore, at step 212, a coefficients matrix U 215 or a plurality of blade coefficients corresponding to the plurality of modes 214 may be determined. The modes matrix M 214 and the coefficients matrix U 215, for example are determined by applying a principal component analysis technique on the normalized delta TOAs 210. It is noted that while the presently contemplated technique explains one embodiment for determination of the static deflections and/or the modes matrix using the principal components analysis technique, other techniques, such as, a singular value decomposition technique, an independent components analysis technique, or combinations thereof may be used. Particularly, the modes matrix M 214, for example, may be determined based upon the normalized delta TOAs 210, and an Eigenvector matrix V determined based upon the normalized delta TOAs 210. The determination of the Eigenvector matrix V is explained in greater detail with reference to FIG. 5. The modes matrix M 214 represents a plurality of modes 214 corresponding to the blades 12. In one embodiment, each row in the modes matrix M 214 represents a mode in the plurality of modes 214. In another embodiment, each column in the modes matrix M 214 represents a mode in the plurality of modes 214. In one embodiment, the plurality of modes 214 or the modes matrix M may be determined by using the following equation:

$$M = X^*V \qquad (1)$$

where M is a modes matrix, X is a matrix of normalized delta TOAs, and V is an Eigenvector matrix.

Figure 7A:
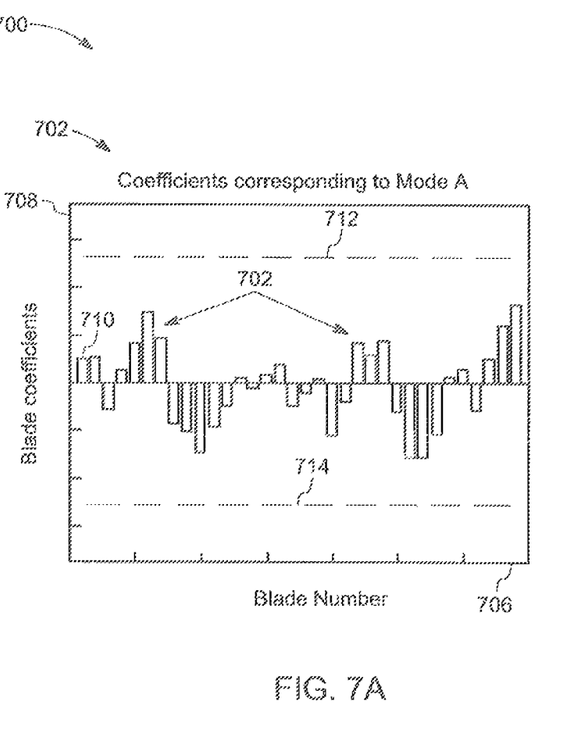
FIG. 7A and FIG. 7B are exemplary graphical representations of coefficients corresponding to two modes for identification of coefficients corresponding to common modes, in accordance with an embodiment of the techniques.
Figure 7B:
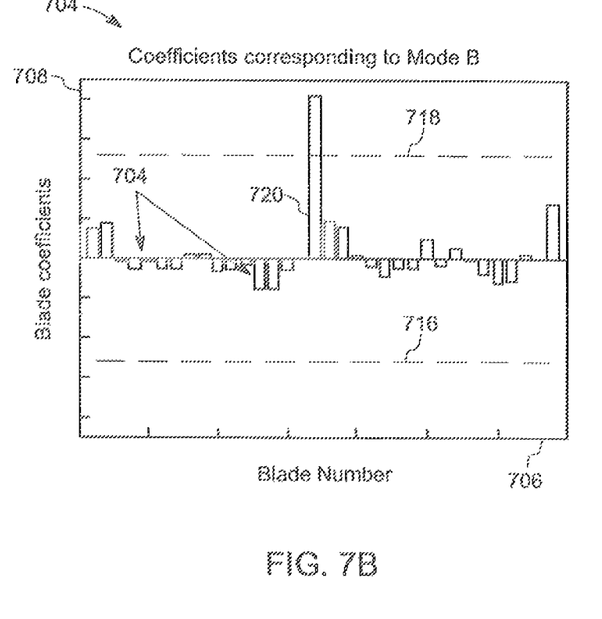

Furthermore, at step 212, the plurality of blade coefficients or the coefficients matrix U 215 may be determined. The coefficients matrix U 215, for example, may be determined based upon the Eigenvector matrix V. The coefficients matrix U 215 represents blade coefficients of the blades 12 corresponding to the plurality of modes 214. In one embodiment when rows in the modes matrix M 214 represent the plurality of modes 214, columns in the coefficients matrix U 215 represents blade coefficients of the blades 12 corresponding to the plurality of modes 214, or vice versa. For example, a row in the coefficients matrix U 215 may represent blade coefficients corresponding to a mode represented by a column in the modes matrix 215, or vice versa. For example, $1^{st}$ row of the coefficients matrix U 215 may represent blade coefficients of the blades 12 corresponding to a mode, wherein the mode is represented by a $1^{st}$ column in the modes matrix M 214. Exemplary graphical representation of two rows of a coefficients matrix U 215 is shown in FIG. 7A and FIG. 7B, respectively.

Furthermore, at step 216, blade coefficients in the coefficients matrix U 215 that correspond to common modes in the plurality of modes 214 are determined. As used herein, the term "common mode" is used to refer to a mode corresponding to blade coefficients of a plurality of blades, wherein the blade coefficients fall within a range. In one embodiment, a range is determined based upon the blade coefficients of blades corresponding to a mode in real-time. In another embodiment, the range is determined based upon common mode selection thresholds. In another embodiment, the blade coefficients in the coefficients matrix U 215 that correspond to common modes, for example, are identified based upon respective common mode selection thresholds. Identification of the blade coefficients that correspond to common modes and determination of common mode selection thresholds is explained in greater detail with reference to FIG. 6, FIG. 7A and FIG. 7B, in accordance with one embodiment of the present techniques.

Furthermore, at step 218, a reconstruction matrix $U_1$ is generated by equating the blade coefficients corresponding to the common modes in the coefficients matrix U 215 equal to zero. Subsequently at step 220, static deflections 222 corresponding to the blades 12 are determined using the reconstruction matrix $U_1$ and the modes matrix M. The static deflection, for example, may be determined using the following equation (2):

$$Y = M*U_1 \qquad (2)$$

wherein Y represents static deflections, M represents a modes matrix, and $U_1$ represents a reconstruction matrix. Subsequently at step 224, the health of the blades 12 may be analyzed based upon the static deflections 222. In one embodiment, when one or more of the static deflections 222 corresponding to one or more of the blades 12 exceed a determined threshold, then faults, defects or cracks in the one or more of the blades 12 may be declared. It is noted that in one embodiment, the multiplication of the modes matrix M 214 to the reconstruction matrix $U_1$ results in removal of effects of common modes in the static deflections 222. Particularly, the multiplication of the modes matrix M and the reconstruction matrix $U_1$ results in the removal of the effects of the common factors from the normalized delta TOAs 210 to determine the static deflections 22 of the blades 12.

Figure 3:
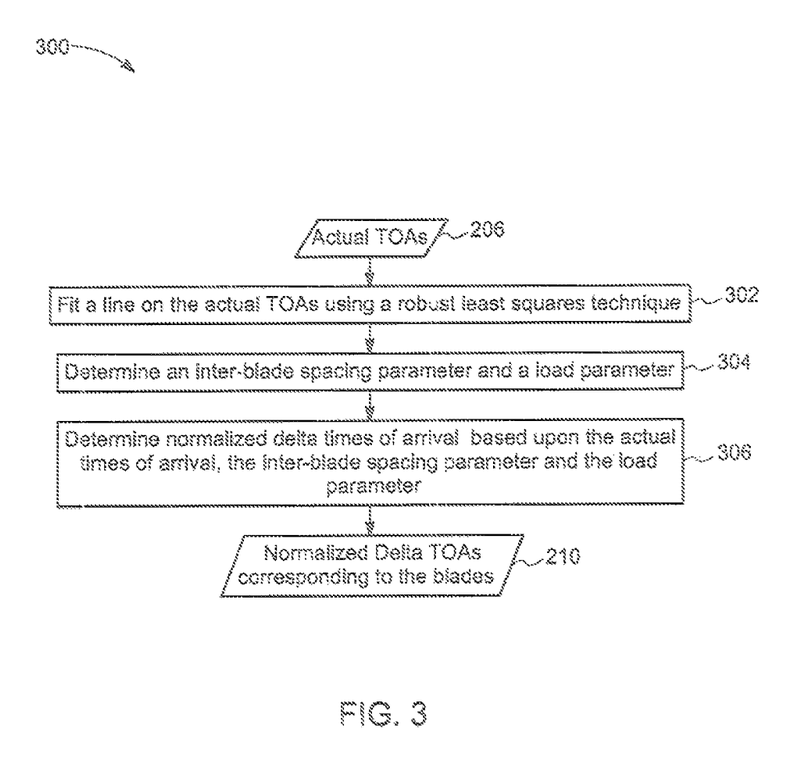
FIG. 3 is a flowchart representing an exemplary method for determining the normalized delta times of arrival referred to in FIG. 2, in accordance with an embodiment of the present techniques.
Figure 4:
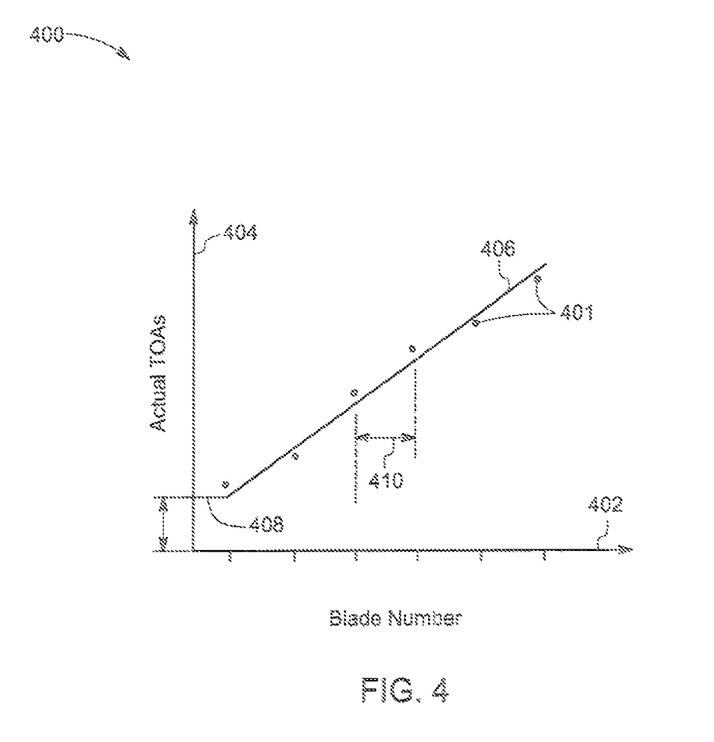
FIG. 4 is an exemplary graphical representation of actual times of arrival that are computed using a robust least squares technique, in accordance with one embodiment of the present techniques.

Referring now to FIG. 3, a flowchart representing an exemplary method 300 for determining the normalized delta TOAs 210 corresponding to the blades 12, in accordance with an embodiment of the techniques, is depicted. In one embodiment, FIG. 3 explains step 208 in FIG. 2 in greater detail. As previously noted, reference numeral 206 is representative of actual times of arrival (TOAs) corresponding to the blades 12. At step 302, a line may be fitted on the actual TOAs 206 using a robust least squares technique. An exemplary fitting of a line on actual TOAs using a robust least squares technique is shown in FIG. 4.

At step 304, an inter-blade spacing parameter and a load parameter may be determined. The inter-blade spacing parameter and the load parameter may be determined using the line fitted on the actual TOAs 206. An exemplary determination of an inter-blade spacing parameter and a load parameter is described with reference to FIG. 4. At step 306, normalized delta TOAs 210 may be determined corresponding to one or more of the blades 12 based upon the inter-blade spacing parameter, the actual TOAs 206 and the load parameter. Particularly, a normalized delta TOA corresponding to a blade may be determined based upon a corresponding actual time of arrival (TOA), a corresponding inter-blade spacing parameter and the load parameter. In one embodiment, the normalized delta TOAs may be determined using the following equation (3):

$$\text{Norm.}\Delta\theta_j(k) = \theta_A(k) - [\lambda(k)(j-1) + \zeta(k)] \qquad (3)$$

wherein Norm·$\Delta\theta_j$ is a normalized delta TOA corresponding to a blade j, $\theta_A$ is an actual time of arrival corresponding to the blade j, j is an identification number of a blade, $\lambda$ is an inter-blade spacing parameter, $\zeta$ is a load parameter, and k is a time stamp.

Referring now to FIG. 4, an exemplary graphical representation 400 of actual TOAs 401 that are fitted on a line 406 using a robust least squares technique, in accordance with one embodiment of the present techniques, is depicted. As shown in FIG. 4, X-axis 402 is representative of identification number of blades, and Y-axis 404 is representative of actual times of arrival (TOAs) corresponding to the blades. The actual TOAs, for example, may be the actual TOAs 206. As shown in the presently contemplated configuration, the line 406 is fitted on the actual TOAs 401 using the robust least squares technique. Furthermore, as shown in FIG. 4, reference numeral 408 is an intercept of the line 406. In the presently contemplated configuration, the intercept 408 is a load parameter corresponding to the blades. Furthermore, reference numeral 410 is an inter-blade spacing parameter corresponding to a blade.

Figure 5:
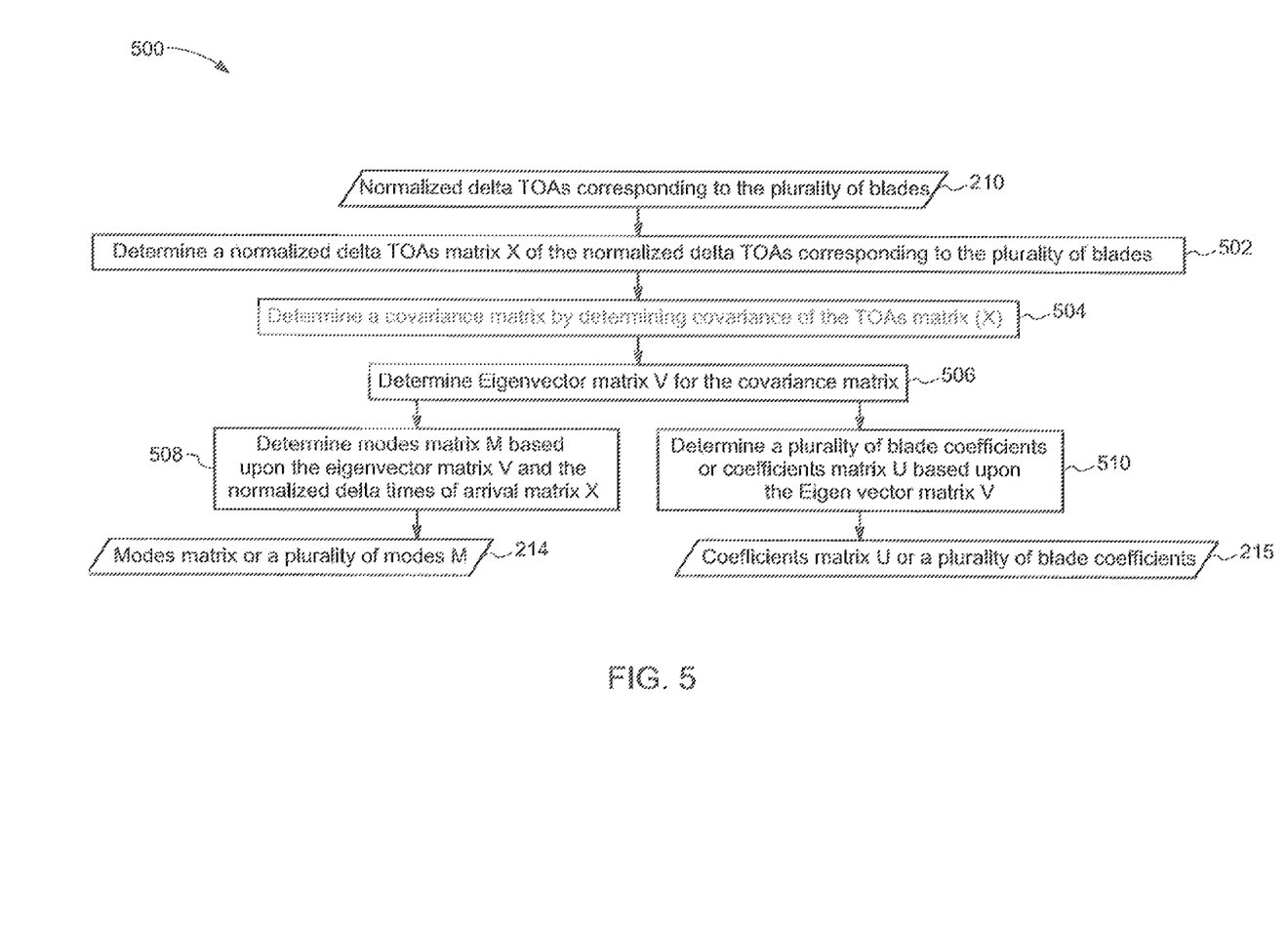
FIG. 5 is a flowchart representing an exemplary method for determining the plurality of modes and a plurality of blade coefficients referred to in FIG. 2, in accordance with an embodiment of the present techniques.

Referring now to FIG. 5, a flowchart representing an exemplary method 500 for determining the modes or the modes matrix 214 and the blade coefficients or the coefficients matrix U 215 in FIG. 2, in accordance with an embodiment of the techniques, is depicted. In one embodiment, FIG. 5 explains step 212 in FIG. 2 in greater detail. As previously noted with reference to FIG. 2, reference numeral 210 is representative of normalized delta TOAs corresponding to the blades 12. In one embodiment, at step 502, a normalized delta TOAs matrix X may be determined using the normalized delta TOAs 210. At step 504, a covariance of the normalized delta TOAs matrix X may be determined to generate a covariance matrix. Furthermore, at step 506, an Eigenvector matrix V is determined for the covariance matrix.

At step 508, the modes matrix M 214 is determined based upon the normalized delta TOAs matrix X and the Eigenvector matrix V. In one embodiment, the modes matrix M is determined by multiplying the matrix X and the Eigenvector matrix V. Consequent to the determination of the modes matrix M 214, the plurality of modes 214 is determined. Particularly, each column in the modes matrix 214 represents a mode in the plurality of modes 214. Furthermore, at step 510, the coefficients matrix U 215 is determined based upon the Eigenvector matrix V. The coefficients matrix U 215, for example, is an inverse of the Eigenvector matrix V. It is noted that in the presently contemplated configuration, the coefficients matrix U 215 represents a plurality of blade coefficients 215 corresponding to the plurality of modes 214. Particularly, either each row or each column in the coefficients matrix U 215 represents blade coefficients corresponding to a mode in the plurality of modes 214. It is noted that while in the presently contemplated configuration, the plurality of modes 214 and the plurality of coefficients 215 are determined by representing and using the normalized delta TOAs 210 as a matrix, in certain embodiments, the plurality of modes 214 and the plurality of coefficients 215 may be determined using other representations of the normalized delta TOAs 210.

Figure 6:
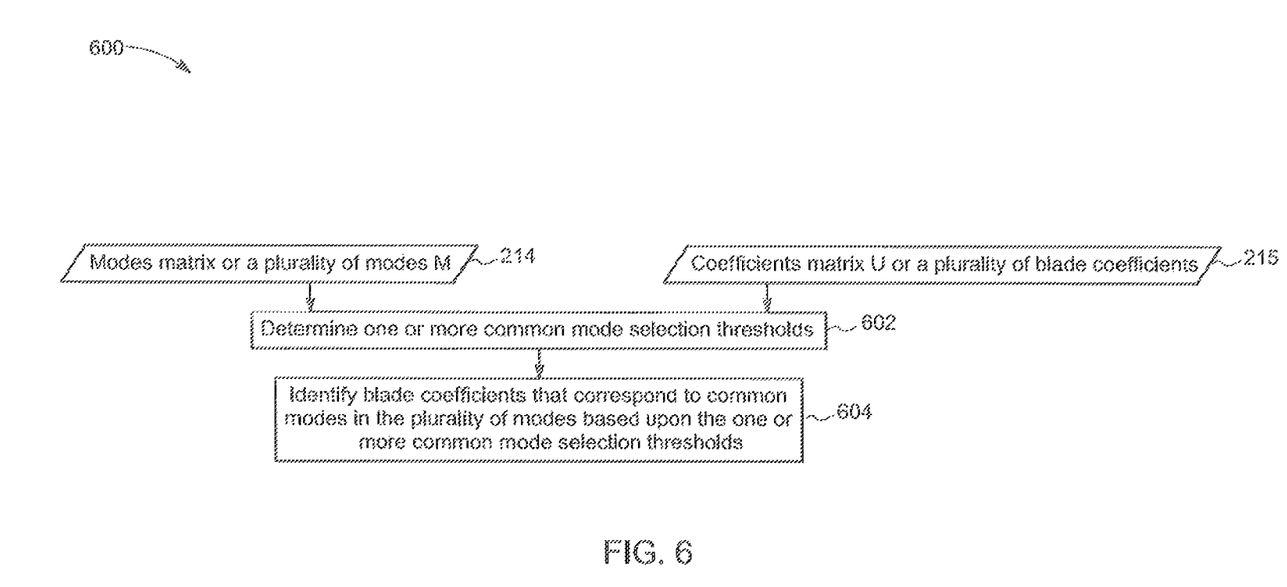
FIG. 6 is a flowchart representing an exemplary method for determining common modes referred to in FIG. 2, in accordance with an embodiment of the present techniques.

Referring now to FIG. 6, a flowchart representing an exemplary method 600 for determining blade coefficients that correspond to common modes in the modes 214, in accordance with an embodiment of the techniques, is depicted. In one embodiment, FIG. 6 explains step 216 in FIG. 2 in greater detail. At step 602, one or more common mode selection thresholds may be determined. As used herein, the term "common mode selection threshold" refers to a numerical value that is determined based upon blade coefficients corresponding to a mode to determine whether the mode is a common mode. In one embodiment, one or more common mode selection thresholds may be determined by calculating the standard deviation or the median value of blade coefficients corresponding to the mode.

Subsequent to the determination of the common mode selection thresholds, at step 604, blade coefficients that correspond to common modes in the plurality of blade coefficients 215 may be identified. The blade coefficients corresponding to the common modes, for example, may be identified using the common mode selection thresholds.

Exemplary graphical representations 700 of a plurality of blade coefficients to explain identification of blade coefficients corresponding to common modes are shown in FIG. 7A and FIG. 7B. Particularly, FIG. 7A and 7B are used to explain steps 602 and 604 in FIG. 6 in greater detail in accordance with one embodiment of the present techniques. In the presently contemplated configuration, a bar plot 702 represents blade coefficients corresponding to a Mode A, and a bar plot 704 represents blade coefficients corresponding to a Mode B. In one embodiment, the blade coefficients corresponding to the Mode A 702, and the blade coefficients corresponding to the Mode B 704 may be the plurality of blade coefficients 215. (See FIG. 2 and FIG. 5). Particularly, the blade coefficients corresponding to the Mode A may be a row in the plurality of blade coefficients or the coefficients matrix 215, and the blade coefficients corresponding to the Mode B 704 may be another row in the plurality of blade coefficients or the coefficients matrix 215. (See FIG. 2).

In each of the FIG. 7A and FIG. 7B, X-axis 706 represents blade numbers of 34 blades, and Y-axis 708 represents blade coefficients of the 34 blades in the respective modes 702, 704. Therefore in the presently contemplated configuration, in the bar plot 702, the X-axis 706 represents blade numbers of the 34 blades, and Y-axis 708 represents blade coefficients of the 34 blades corresponding to the Mode A. Similarly, in the bar plot 704, the X-axis 706 represents blade numbers of the 34 blades, and the Y-axis 708 represents blade coefficients of the 34 blades corresponding to the Mode B. For example, a bar 710 in the bar plot 702 represents a blade coefficient of a $1^{st}$ blade corresponding to the Mode A.

In one embodiment, blade coefficients that correspond to common modes are identified based upon one or more common mode selection thresholds. In the presently contemplated configuration, the blade coefficients of the 34 blades corresponding to Mode A 702 has two common mode selection thresholds 712, 714. Furthermore, the blade coefficients corresponding to the Mode B 704 has two common mode selection thresholds 716, 718. In one embodiment, the common mode selection thresholds 712, 714, for example, are determined by calculating the standard deviation or the median values of the blade coefficients of the 34 blades corresponding to the Mode A. Similarly, the common mode selection thresholds 716, 718 are determined by calculating the standard deviation or the median values of blade coefficients of the 34 blades corresponding to the Mode B.

Furthermore, in one embodiment, blade coefficients corresponding to common modes are identified by comparing blade coefficients corresponding to a mode to corresponding one more common mode selection thresholds. Therefore, for determination of blade coefficients corresponding to common modes, the blade coefficients corresponding to the Mode A 702 are compared to the common mode selection thresholds 712, 714. Similarly, the blade coefficients corresponding to the Mode B 704 are compared to the corresponding common mode selection thresholds 716, 718.

As shown in FIG. 7A, blade coefficients of the 34 blades in Mode A do not exceed the common mode selection thresholds 712, 714. Therefore, each of the blade coefficients corresponding to the Mode A 702 is identified as a blade coefficient corresponding to a common mode. Accordingly, it may be declared that Mode A is a common mode. Since the Mode A is a common mode, the blade coefficients of the 34 blades corresponding to Mode A 702 are equated to zero to generate a row or a column in a reconstruction matrix, such as, the reconstruction matrix $U_1$ referred to in step 218 in FIG. 2. However, in FIG. 7B, a blade coefficient 720 of a $17^{th}$ blade corresponding to the Mode B exceeds a corresponding common mode selection threshold 718. Accordingly, in one embodiment, the Mode B may be declared as not being a common mode. In an embodiment, when the Mode B is declared as not being a common mode, the blade coefficients of the 34 blades corresponding to Mode B 704 are retained, and are not equated to zero. Accordingly, in such embodiment, the blade coefficients 704 corresponding to the Mode B form a row or a column in the reconstruction matrix $U_1$ referred to in step 218 in FIG. 2. In another embodiment, the blade coefficients 704 of all the blades except the $17^{th}$ blade corresponding to Mode B 720 may be equated to zero. Accordingly, in this embodiment, the blade coefficient 720 is retained to generate a row or a column in the reconstruction matrix $U_1$.

Figure 8:
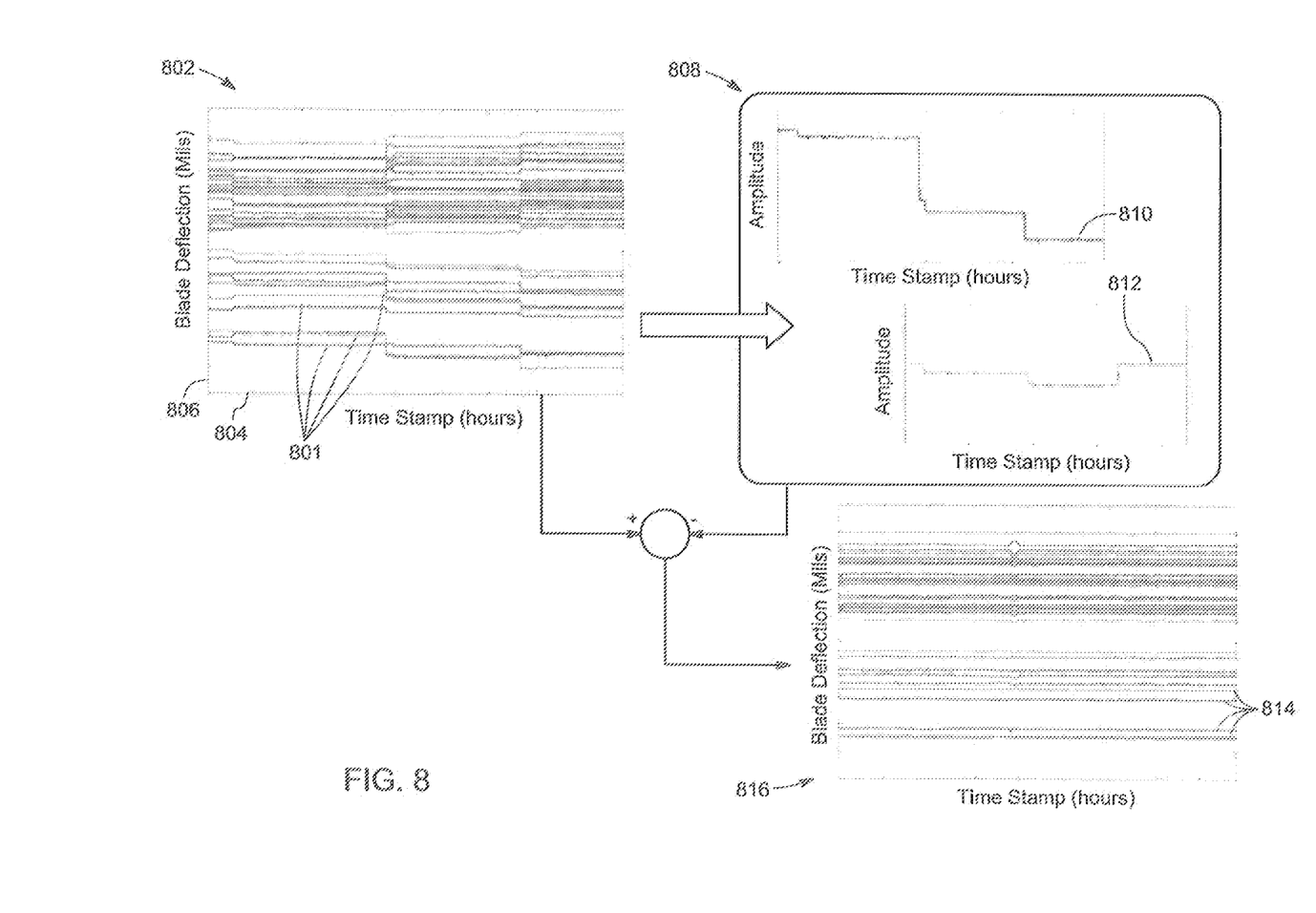
FIG. 8 is a graphical representation of signals representative of normalized delta times of arrival, common modes or blade coefficients corresponding to common modes, and static deflection corresponding to a plurality of blades are shown to explain determination of static deflection, in accordance with one embodiment of the present techniques.

FIG. 8 is a graphical representation of signals that are representative of normalized delta TOAs, signals that are representative of common modes, and signals that are representative of static deflection of a plurality of blades, in accordance with one embodiment of the present techniques. As shown in FIG. 8, graph 802 is a graphical representation of the signals that are representative of normalized delta TOAs 801 corresponding to thirty blades. X-axis 804 in the graph 802 represents time stamps, and Y-axis 806 in the graph 802 represents normalized delta TOAs. Each of the lines 801 shown in the graph 802 represents a signal representative of normalized delta TOAs. The graph 802 shows signals representative of normalized delta TOAs corresponding to thirty blades at multiple time stamps. The normalized delta TOAs 801 in the graph 802, for example, may be the normalized delta TOAs 210. (See FIG. 2 and FIG. 3).

Figure 9:
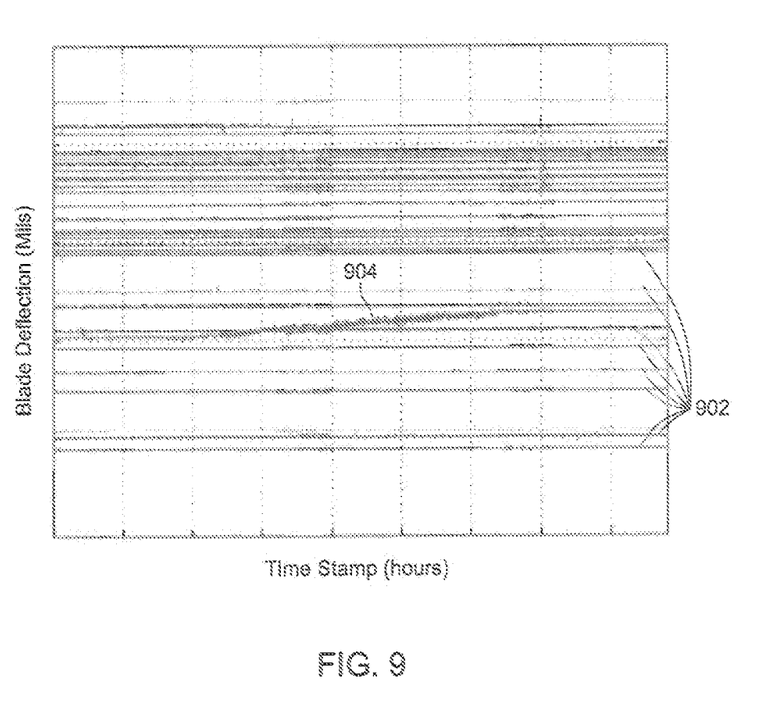
FIG. 9 is a graphical representation of signals representative of static deflections of blades that are shown to explain monitoring of the health of the blades.

In one embodiment, the signals representative of normalized delta TOAs 801 in the graph 802 is processed to identify signals representative of common modes 810, 812 in a plurality of modes is shown in graph 808. The signals representative of common modes 810, 812, for example, may be identified using the techniques described with reference to FIG. 2 to FIG. 7. As previously noted in steps 218 and 220, static deflection corresponding a plurality of blades is determined by removing the effects of common modes from normalized delta TOAs. In the presently contemplated configuration, the effects of the signals representative of common modes 810, 812 are removed from each of the signals representative of normalized delta TOAs 801 to generate signals representative of static deflection 814 shown in a graph 816. The removal of the effects of the signals representative of the common modes 810, 812 results in removal of effects of common factors from the signals representative of the normalized delta TOAs 801 to generate the signals 814. The effects of signals representative of common modes 810, 812, for example, may be removed by using techniques described with reference to step 218 in FIG. 2. In the presently contemplated configuration, the signals representative of static deflection 814 do not show any defect or faults in the 30 blades. In the presently contemplated configuration, signals representative of static deflection 814 do not show any defect as the signals 814 corresponding to all the 30 blades follow a similar trend. For exemplary purposes, graphical representation of signals representative of static deflection 902 corresponding to a set of 30 blades is shown in FIG. 9 to show a defect in one of the 30 blades. In FIG. 9, each line represents a signal representative of static deflection corresponding to a blade in the 30 blades. As shown in the presently contemplated configuration, each of the 30 blades follows a similar trend except a signal 904 corresponding to a blade (hereinafter referred to as a blade A). In other words, the signal representative of static deflection 904 corresponding to the blade A shows a unique trend in comparison to signals representative of static deflections corresponding to the rest of the 29 blades. The signal representative of static deflection 904 corresponding to the blade A may be extracted and processed further to determine whether a defect or a crack exists in the blade A. As previously noted with reference to FIG. 2, a crack or a defect in a blade may be determined by comparing the static deflection corresponding to a blade to a corresponding static deflection threshold.

The embodiments of the present techniques result in determination of the static deflection of blades in real-time. Static deflections of the blades, for example may be used in detection of fault or defects in the blades. In addition, the present techniques deduct the effects of common factors from actual TOAs or normalized delta TOAs to determine the static deflection. It is noted that the present systems and techniques determined static deflections by removing the effects of common factors on the blades without recourse to any data related to the common factors, such as, operational parameters. The present techniques determine the static deflections in an automated manner without human interference, and in real-time. The static deflections of the blades are used to determine health of the blades. For example, the static deflections may be used to identify crack, bend, or any other fault in the blades in real-time.

It is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objectives or advantages as may be taught or suggested herein.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural element with insubstantial differences from the literal languages of the claims.

What is claimed is:

1. A method comprising:
   determining normalized delta times of arrival corresponding to a plurality of blades based upon actual times of arrival corresponding to the plurality of blades;
   determining static deflections of the plurality of blades by removing effects of one or more common factors from the normalized delta times of arrival corresponding to the plurality of blades; and
   wherein determining the static deflections of the plurality of blades comprises:
      determining a plurality of modes and a plurality of blade coefficients based upon the normalized delta times of arrival;
      identifying blade coefficients in the plurality of blade coefficients that correspond to common modes in the plurality of modes based upon the plurality of blade coefficients;
      generating a reconstruction matrix by equating the blade coefficients corresponding to the common modes equal to zero; and
      determining the static deflections of the plurality of blades based upon the plurality of modes and the reconstruction matrix.

2. The method of claim 1, wherein determining the normalized delta times of arrival comprises:
   determining an inter-blade spacing parameter and a load parameter based upon the actual times of arrival; and
   determining the normalized delta times of arrival based upon the actual times of arrival, the inter-blade spacing parameter and the load parameter.

3. The method of claim 1, wherein determining the static deflections of the plurality of blades comprises removing the effects of the one or more common factors without recourse to data on the one or more common factors.

4. The method of claim 1, further comprising analyzing the static deflections of the plurality of blades to determine the health of the plurality of blades.

5. The method of claim 1, wherein determining the normalized delta times of arrival comprises applying a robust least squares technique, a weighted least squares technique, or combinations thereof on the actual times of arrival.

6. The method of claim 1, wherein determining the plurality of modes comprises:
   determining a covariance matrix based upon the normalized delta times of arrival;
   determining an Eigenvector matrix for the covariance matrix; and
   determining the plurality of modes based upon the normalized delta times of arrival and the Eigenvector matrix.

7. The method of claim 6, wherein determining the plurality of blade coefficients comprises determining an inverse of the Eigenvector matrix.

8. The method of claim 1, wherein identifying blade coefficients in the plurality of blade coefficients that correspond to the common modes comprises:
   determining one or more common mode selection thresholds based upon respective blade coefficients corresponding to a mode in the plurality of modes; and
   identifying the blade coefficients based upon the one or more common mode selection thresholds.

9. A system comprising:
   a processing subsystem that:
   determines normalized delta times of arrival corresponding to a plurality of blades based upon actual times of arrival corresponding to the plurality of blades;
   generates static deflections of the plurality of blades by removing effects of one or more common factors from the normalized delta times of arrival corresponding to the plurality of blades by:
      determining a plurality of modes and a plurality of blade coefficients based upon the normalized delta times of arrival;

identifying blade coefficients in the plurality of blade coefficients that correspond to common modes in the plurality of modes based upon the plurality of blade coefficients;

generating a reconstruction matrix by equating the blade coefficients corresponding to the common modes equal to zero; and determining the static deflections of the plurality of blades based upon the plurality of modes and the reconstruction matrix.

10. The system of claim 9, wherein the processing subsystem determines the normalized delta times of arrival by applying a least squares technique, a robust least squares technique, a weighted least squares technique, or combinations thereof on the actual times of arrival.

11. The system of claim 9, wherein the one or more common factors comprise operational parameters, reseating of the plurality of blades, or combinations thereof.

12. The system of claim 9, wherein the processing subsystem removes the effects of the one or more common factors without data on the one or more common factors.

13. The system of claim 9, further comprising a plurality of sensing devices that are in an operational communication with the processing subsystem, wherein the plurality of sensing devices generate blade passing signals that are representative of the actual times of arrival of the plurality of blades.

14. The system of claim 9, wherein the processing subsystem removes the effects of the one or more common factors from the normalized delta times of arrival comprises applying techniques comprising a principal components analysis technique, a singular value decomposition technique, an independent component analysis technique, or combinations thereof.

15. A system comprising:
 a processing subsystem configured to:
 determine a plurality of modes corresponding to a plurality of blades based upon normalized delta times of arrival corresponding to the plurality blades;
 determine a plurality of blade coefficients corresponding to the plurality of modes and the plurality of blades based upon the normalized delta times of arrival;
 identify one or more blade coefficients in the plurality of blade coefficients that correspond to common modes in the plurality of modes;
 equate the one or more blade coefficients in the plurality of blade coefficients to zero to generate a reconstruction matrix; and
 determine static deflections corresponding to the plurality of blades based upon the normalized delta times of arrival and the plurality of modes.

16. The system of claim 15, wherein the processing subsystem is further configured to determine the normalized delta times of arrival corresponding to the plurality of blades by applying a robust least squares technique on actual times of arrival.

17. The system of claim 15, wherein the processing subsystem is further configured to determine the normalized delta times of arrival corresponding to the plurality of blades by:
 determining an inter-blade spacing parameter and a load parameter based upon the actual times of arrival; and
 determining the normalized delta times of arrival based upon the actual times of arrival, the inter-blade spacing parameter, and the load parameter.

18. The system of claim 15, wherein the processing subsystem is further configured to determine the plurality of modes corresponding to the plurality of blades by:
 determining a normalized delta times of arrival matrix based upon the normalized delta times of arrival corresponding to the plurality of blades;
 determining a covariance matrix by determining a covariance of the normalized delta times of arrival matrix;
 determining an Eigenvector matrix for the covariance matrix; and
 determining the plurality of modes based upon the normalized delta times of arrival matrix and the Eigenvector matrix.

* * * * *